Dec. 26, 1967  G. DE COYE DE CASTELET  3,359,950

DIESEL ROTARY ENGINES

Filed May 21, 1965  2 Sheets-Sheet 1

Inventor
Gaëtan De Coye DeCastelet
By Stevens, Davis, Miller + Mosher
Attorneys

Inventor
Gaëtan De Coye De Castelet
By Stevens, Davis, Miller & Mosher
Attorneys

United States Patent Office 3,359,950
Patented Dec. 26, 1967

3,359,950
DIESEL ROTARY ENGINES
Gaetan de Coye de Castelet, Billancourt, France, assignor to Regie Nationale des Usines Renault, Billancourt, France, a French works under the control and the authority of the French Government
Filed May 21, 1965, Ser. No. 457,727
Claims priority, application France, May 29, 1964, 976,485, Patent 1,426,123
3 Claims. (Cl. 123—8)

ABSTRACT OF THE DISCLOSURE

A rotary diesel engine having $(n+1)$ working chambers formed by a stator with a rotor mounted therein. Combustion chambers formed communicating with the working chambers and so located that the natural turbulence of the engine causes turbulence in the combustion chamber. The inlet ducts leading to the working chambers are curved to provide inlet turbulence complementing the natural turbulence. The rotor has a greater clearance on one side than the other to provide a blow-off effect further complementing the aforesaid turbulences.

---

It has already been proposed to construct a diesel or compression-ignition rotary engine comprising a rotor having $n$ lobes of epicycloidal contour revolving eccentrically in a stator having $(n+1)$ lobes constituting $(n+1)$ working chambers.

This diesel engine was of a type having a turbulence prechamber, the turbulence being produced by an orifice of relatively small dimensions provided between the chamber and the prechamber. It appeared that with this specific rotary engine a natural turbulence is created in the working chambers due simply to the engine rotation and that this turbulence may be directly utilized for inducing a turbulence in a cylindrical combustion chamber having its axis parallel to the engine axis of rotation, it being possible to give very large dimensions to the aperture between this cylindrical combustion chamber and the working chamber in order to avoid the transfer of gas when expansion takes place.

The present invention relates to a diesel rotary engine utilizing this natural turbulence, which is characterized notably in that there is associated with each lobe of the engine stator a cylindrical combustion chamber having the same axial length as the rotor, and wherein one or more injectors distribute the fuel into the air stream induced in said chamber.

This arrangement is advantageous with respect to that of piston diesel engines in that it produces nearly mathematically the various turbulences in only two dimensions, instead of the three dimensions in which they had to be studied heretofore.

The advantage arising in comparison with the disposals applied to other types of rotary engines is the natural creation of turbulence in fixed working chambers, the absence of a sealing-segment passage along the combustion chamber, as these segments are a source of leakage, as well as the posibility of utilizing the entire length of the generatrix.

It is another feature of this invention to cause induction air to penetrate in a plane exactly perpendicular to the engine axis and to the generatrices of the working and combustion chambers by inclining the corresponding duct sufficiently to add the induction turbulence to the natural turbulence.

It is a complementary feature of this invention to properly position, at substantially equally spaced angular intervals, the tie-bolts used for clamping the flanges. These tie-bolts are located as near as possible to the contour of the working chambers in order to provide a very satisfactory joint between the various component elements necessary for each working chamber, such as the combustion chamber, inlet valve and exhaust valve, being regularly interposed between said tie-bolts. The two valves may be disposed adjacent to each other, and the combustion chamber may be disposed on the left-hand or right-hand side of these valves, or between the two valves.

In order to afford a clearer understanding of this invention and of the manner in which the same may be carried out in practice, reference will now be made to the accompanying drawings illustrating diagrammatically by way of example typical forms of embodiment of this invention. In the drawings.

Figure 1:
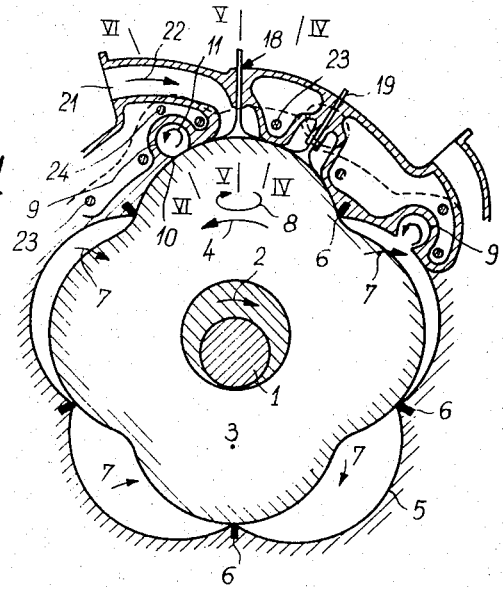
FIGURE 1 is a fragmentary cross-section showing the rotary engine according to this invention which comprises four lobes and five working chambers, this figure illustrating in detail only the stator portion corresponding to one of the working chambers, the other portions of this stator having the same disposal for each working chamber.

Referring first to FIGURE 1 it will be seen that about the eccentric 1 revolving in the direction of the arrow 2 the rotor 3 having an epicycloidal contour and four lobes revolves in the direction of the arrow 4.

The stator 5 comprises five hollow lobes consisting of the envelopes of the rotor contour bounded by the sealing segments 6 according to the known technique, these lobes thus forming the aforesaid five working chambers; the rotor position illustrated in FIGURE 1 corresponds to the top dead center of the upper chamber. If we follow the rotor movement in relation to the stator we see that the variation in the position of the center of gravity of the volume of the chambers travels in the direction of the arrows 7, so that in each working chamber the variation in the center of gravity of this volume, during one revolution of the eccentric 1, follows the arrow 8; in other words, to each revolution of the crankshaft there is a corresponding rotation of the air contained in said chamber in the same direction as the crankshaft rotation and in the direction opposite to that of said rotor.

Otherwise stated, the "four-teeth" rotor meshes in each working chamber with an air pinion revolving four times faster in a direction opposite to the rotor rotation while having variable volumes accordingly as this air is expanded or compressed; therefore this velocity of rotation equal to the crankshaft speed provides a considerable and well-defined turbulence in both dimensions and this turbulence is identical throughout the length of the generatrix.

According to this invention a cylindrical combustion chamber such as 9 opens widely into the outer periphery of each working chamber through a rectangular aperture of which the small side is at 10 and the long side is the generatrix. The air contained in this working chamber may also be considered as constituting a small-diameter gear meshing with the air gear of each chamber which is materialized by the arrow 8 and revolves, of course, in the opposite direction as shown by the arrow 11, still in two dimensions, and identically throughout the length of the generatrix.

Figure 6:
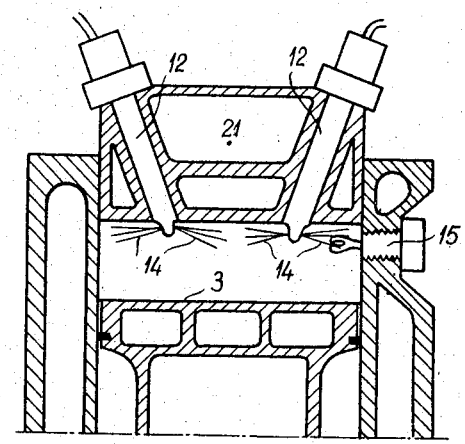
FIGURE 6 is also a fragmentary longitudinal section taken upon the plane VI—VI of FIGURE 1 through the combustion chamber and the inlet duct, as seen on a larger scale.
Figure 7:
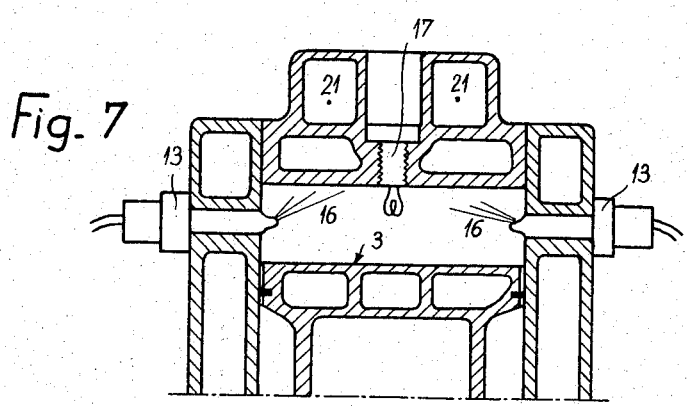
FIGURE 7 is a modified arrangement of the engine portion illustrated in FIGURE 6, to show another disposal of the fuel injectors.

By way of example, the injection may be effected as shown in FIGURE 6 through injectors 12 or as shown in FIGURE 7 through injectors 13. In the first case two injectors open into the chamber along one generatrix and the jets produced thereby are directed substantially as shown at 14, with a starting glow plug 15 mounted in one of the end flanges. If desired, only one injector may be disposed centrally of the generatrix. In the second case (FIGURE 7), the jets issuing from injectors 13 mounted in the two lateral flanges are directed substantially as shown at 16 and the starting glow plug is located centrally of a generatrix.

Figure 2:
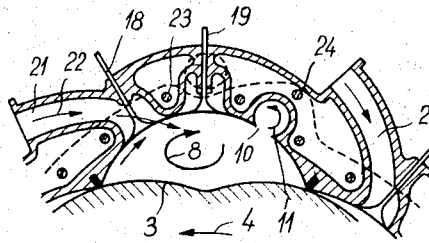
FIGURES 2 and 3 are modified forms of embodiment of the structure shown in FIGURE 1.
Figure 3:
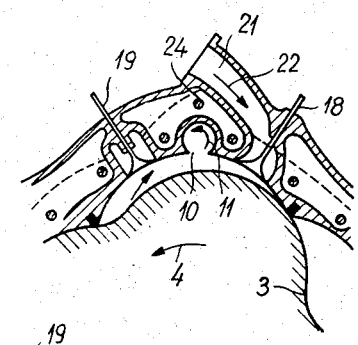

In FIGURES 1, 2 and 3 the inlet valve 18 and exhaust valve 19 actuated in the conventional manner are also shown.

Figure 5:
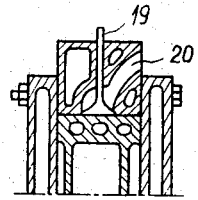
FIGURE 5 is another fragmentary longitudinal section taken upon the line V—V of FIGURE 1.

FIGURE 5 shows that the exhaust duct 20 is directed in an axial plane backwards of the relevant stator portion while on the contrary the inlet duct 21 (FIGURE 3) has its axial plane coincident with that of the rotor and therefore perpendicular to the engine axis. The axis of this inlet duct intersects the working chamber with a relatively small angle.

As clearly shown in each FIGURE 1, 2 and 3 the path followed by the combustion air as shown by the arrow 22 is tangent to, and has the same direction as, the rotation materialized by the arrow 8; thus, instead of counteracting the natural rotation it adds itself thereto, by symmetry, and does not create any stray or detrimental turbulence in the direction of the generatrices.

In the arrangement illustrated in FIGURE 1 the combustion chamber is disposed on the left-hand side of the two valves; in FIGURE 2, it is on the right-hand side and in FIGURE 3 it extends between the two valves.

In order further to promote the turbulence in the same direction an operative clearance is provided between the rotor and its envelope on the stator, this clearance being greater on the right-hand side of the combustion chamber than on the left-hand side in order to produce a complementary blowoff effect from left to right when the rotor is in its top dead center position, thus promoting in the same direction the turbulence and the rotation of the mass of air in the combustion chamber, that is in the direction of the arrow 11.

Figure 4:
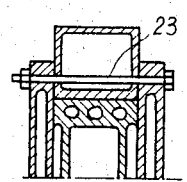
FIGURE 4 is a fragmentary longitudinal section taken upon the line IV—IV of FIGURE 1.

It will also be seen that the tie bolts 23 are regularly spaced and interposed between the various component elements of the stator, at points as close as possible to the curved contour of this stator; as shown in FIGURE 4, the gas-tight seal is obtained under the best possible conditions.

Figure 8:
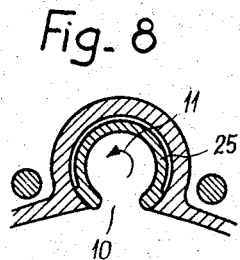
FIGURE 8 is a detail view showing on a larger scale the combustion chamber provided with a liner.
Figure 9:
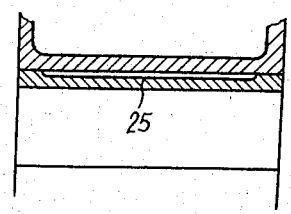
FIGURE 9 is a longitudinal sectional view of the detail shown in FIGURE 8.

In the combustion chamber a liner 25 (FIGURE 8) more or less tightly fitted at its ends may be mounted, this liner having no contact with the cooled wall portions of the chamber in its central region in order to preserve a high operating temperature according to the method already known per se.

I claim:

1. A diesel rotary engine of the type comprising a rotor of epicycloidal contour having $n$ lobes, a stator having $(n+1)$ lobes, said rotor being mounted for eccentric revolution within said stator to provide $(n+1)$ working chambers, a cylindrical combustion chamber associated with each working chamber and communicating therewith through a rectangular aperture, said combustion chamber having the same length as the rotor and having a turbulence induced therein by natural turbulence created by the movement of the rotor in the stator, inlet valve means and exhaust valve means provided in each said working chamber, said combustion chamber being disposed in said working chamber adjacent said valve means, the mesial plane of inlet ducts leading to each said inlet valve means being coincident with that of the rotor, the axis of said ducts being curved in order to add inlet turbulence to the natural turbulence of the engine, the clearance between the rotor and the stator being greater on one side than on the other side of the combustion chamber in order to provide a blowoff effect complementing the aforesaid turbulences, and fuel injector means disposed symmetrically in said combustion chamber.

2. Rotary engine according to claim 1, in which assembly tie bolts are regularly spaced and interposed between the component elements of the working chamber tangential to the curved surface of said working chamber.

3. Rotary engine according to claim 1, in which said combustion chamber is provided with a cylindrical hot liner spaced from the wall of said chamber throughout substantially its entire surface.

References Cited

UNITED STATES PATENTS

| 3,131,678 | 5/1964 | Peras | 123—8 |
| 3,216,404 | 11/1965 | Peras | 123—8 |
| 3,253,583 | 5/1966 | Tsukagawa | 123—8 |

FOREIGN PATENTS

| 623,271 | 4/1963 | Belgium. |
| 1,278,136 | 10/1961 | France. |

ROBERT A. O'LEARY, *Primary Examiner.*

WILBUR J. GOODLIN, *Examiner.*